(12) United States Patent
Szyperski et al.

(10) Patent No.: US 8,214,340 B2
(45) Date of Patent: *Jul. 3, 2012

(54) OBSERVING AND REPORTING CHANGES IN COMPLEX SOFTWARE DEPENDENCIES

(75) Inventors: Clemens A. Szyperski, Redmond, WA (US); Geoffrey M. Kizer, Seattle, WA (US); Joshua R. Williams, Seattle, WA (US); Anthony J. Moore, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/016,859

(22) Filed: Jan. 28, 2011

(65) Prior Publication Data

US 2011/0131191 A1 Jun. 2, 2011

Related U.S. Application Data

(63) Continuation of application No. 12/037,000, filed on Feb. 25, 2008, now Pat. No. 7,899,798.

(51) Int. Cl.
*G06F 7/00* (2006.01)
*G06F 17/00* (2006.01)
(52) U.S. Cl. ........................ 707/702; 707/806
(58) Field of Classification Search .......... 707/600–831; 717/120, 121, 122, 144, 154, 170
See application file for complete search history.

(56) References Cited

U.S. PATENT DOCUMENTS

| | | | |
|---|---|---|---|
| 5,991,536 A | 11/1999 | Brodsky et al. | |
| 6,256,712 B1 | 7/2001 | Challenger et al. | |
| 6,292,803 B1 | 9/2001 | Richardson et al. | |
| 6,424,354 B1 | 7/2002 | Matheny et al. | |
| 6,817,019 B1 | 11/2004 | Wang et al. | |
| 6,895,401 B2 | 5/2005 | Skinner et al. | |
| 7,051,105 B2 | 5/2006 | Lauzon et al. | |
| 7,133,874 B2 | 11/2006 | Hill et al. | |
| 7,376,945 B1 | 5/2008 | Kakumani et al. | |
| 7,415,706 B1 | 8/2008 | Raju et al. | |
| 7,836,031 B2* | 11/2010 | Howard et al. | 707/702 |
| 7,860,900 B2* | 12/2010 | Szyperski et al. | 707/804 |
| 7,899,798 B2* | 3/2011 | Szyperski et al. | 707/702 |
| 2003/0135638 A1 | 7/2003 | Brabson et al. | |
| 2004/0010522 A1 | 1/2004 | Shulok | |
| 2005/0091219 A1 | 4/2005 | Karachale et al. | |
| 2007/0162903 A1 | 7/2007 | Babb, II et al. | |
| 2009/0216782 A1 | 8/2009 | Szyperski et al. | |

OTHER PUBLICATIONS

Chou et al., Versions and change notification in an object-oriented database system, Jun. 12-15, 1988, IEEE, 275-281.*

(Continued)

*Primary Examiner* — Jean B Fleurantin
(74) *Attorney, Agent, or Firm* — Workman Nydegger

(57) ABSTRACT

An observation system includes mechanisms for efficiently tracking the state of source components, which include functions, arguments, or values, etc. In one implementation, an observing component requests that a source component processes a request. The observation system then identifies all possible components in a dependency chain for the request, and all such components that are configured for change notifications. A dependency registry stores a representation of each identified component that is configured for change notifications. Any time any component configured for change notifications changes, including indirectly related components, the observing component can be immediately notified of the change, without having to reprocess the entire set of component dependencies.

19 Claims, 4 Drawing Sheets

OTHER PUBLICATIONS

"NSKeyValueObserving Protocol Reference," Author Unknown, Copyright Apple Inc. 2007, pp. 1-23, [online] [retrieved on Dec. 24, 2007] Retrieved from the Internet: http://developer.apple.com/documentation/Cocoa/Reference/Foundation/Protocols/NSKeyValueObserving_Protocol/Reference/Reference.html#//apple_ref/doc/uid/20002299-12293.

"Continual Queries for Internet Scale Event-Driven Information Delivery," by Ling Liu, Calton Pu and Wei Tang, IEEE Transactions on Knowledge and Data Engineering, vol. 11, No. 4, Jul./Aug. 1999 [online] [retrieved on Dec. 24, 2007], pp. 610-628. Retrieved from the Internet: http://ieeexplore.ieee.org/iel5/69/17192/00790816.pdf?tp=&arnumber=790816&isnumber=17192.

"Active change notifications in advanced knowledge base servers," by Martin Staudt, Matthias Jarke and Christoph Quix, Aug. 6, 2002, IEEE, pp. 96-99.

"A CORBA-based architecture for service change notification," by Twittie Senivongse and Pasin Suriyentrakorn, Aug. 7, 2002, IEEE, pp. 22-33.

* cited by examiner

OBSERVING AND REPORTING CHANGES IN COMPLEX SOFTWARE DEPENDENCIES

CROSS-REFERENCE TO RELATED APPLICATIONS

This Application is a continuation of, and claims the benefit of and priority to, U.S. patent application Ser. No. 12/037,000, filed on Feb. 25, 2008, and entitled "OBSERVING AND REPORTING CHANGES IN COMPLEX SOFTWARE DEPENDENCIES," which application is expressly incorporated herein by this reference in its entirety.

BACKGROUND

Background and Relevant Art

Application programs used within computerized systems typically include a number of different components or modules that depend on each other for various different reasons. For example, a simple calculator application program might include an output display component, which depends on receiving one or more values from a calculation module, which in turn depends on receiving one or more number and function inputs before executing a calculation and passing it to the display component. Thus, the output component would be dependent not only on the display component, but on each of the various components that receive input from the number or function keys in a device. One will appreciate that such dependencies can become even more complex, particularly when individual application programs depend on each other for various values.

For example, a computerized system might include an attached display device, and one or more display application programs that render output to be displayed. The one or more display application programs driving the display device, however, may be configured somewhat passively to display information only when the underlying information is directly passed to the output module (i.e., listening for pushed information). Even then, the display application may be configured only to send new rendering information to the display device whenever a user refreshes the display. Such a scenario is fairly common with internet browser programs that are used to view information contained in internet websites. If the information in the internet websites that the user would like to view is continually changing, the user may need to continually refresh the internet browser in order to see the changes.

For example, a user may execute one or more display applications to view one or more different accounts (e.g., internet banking), each of which may include continually updated information. The display application may be further configured to filter this information so that only the largest two accounts are ever added together and displayed. In such a situation, therefore, there may be multiple different components used to display the information, including one or more underlying interfaces for reporting each of the account values, as well as one or more intermediate interfaces for determining which of the accounts has the greatest value, and are to be added. Unfortunately, depending on how each of these underlying interfaces may be configured, the display application could be displaying stale or even inaccurate account information almost instantaneously. For example, during the brief time the account values were passed to the intermediate calculation interface, and before the corresponding values have been calculated and passed to the display interface, one or more of the underlying accounts could have been updated again.

Conventional mechanisms for refreshing data in a dependency chain such as this tend to be either completely passive, or computationally expensive. In a passive configuration, the underlying components in the dependency chain simply wait for a recalculation request from the top down, such as when a user manually requests a refresh through the display application. In a completely automated configuration, however, each interface and component in a dependency chain might be configured to continually request updates from each other every few seconds. Alternatively, the display application might be configured to continually request updates from the underlying intermediate interfaces by some predetermined interval. Automated implementations such as these tend to be computationally expensive for a number of different reasons, and thus often difficult to apply on a broad basis.

For example, some underlying components in a dependency chain may change often, while other underlying components may change rarely or infrequently. With reference to the above-identified account example, some accounts may be accessed and updated frequently, while others may be updated rarely if ever. Performing the same number of refresh requests on each underlying account is thus unnecessary. While using a frequent refresh configuration for small numbers of components that change infrequently may not cause too many problems, a frequent refresh rate with a large number of components that are continually changing (e.g., stock ticker data) could potentially crash or freeze a computer system.

In addition, if all of the interfaces are not appropriately configured, an important dependency could be missed, and a generic refresh command could still result in an inaccurate calculation. Referring to the example above, a generic refresh command to revalue and calculate the previously added largest two accounts could potentially miss the fact that another account had been updated and thus displaced one of the originally added accounts. Although it is possible that each underlying account could be configured to send a signal to another intermediate component each time there is an update to the account, this can also result in other difficulties, particularly if there are any updates or changes to the intermediate components in subsequent software upgrades. Such problems can be particularly acute with large, continually changing dependency chains in complex software.

Accordingly, there are a number of difficulties associated maintaining current values within software dependency chains that can be addressed.

BRIEF SUMMARY

Implementations of the present invention provide systems, methods, and computer program products configured to efficiently report data freshness to components that depend on a plurality of other components. In particular, implementations of the present invention include one or more mechanisms that allow an observation system identify one or more source components in a complex dependency chain, and to identify those components that are configured to change at some point. Implementations of the present invention further include one or more mechanisms that allow the observing component to directly identify that one of the underlying source components in the dependency chain has changed, without necessarily having to reprocess the entire dependency chain of components.

For example, a method from the perspective of an observation system of reporting data freshness directly to an observing component can involve receiving one or more requests from an observing component to process data corresponding to one or more source components. The method can also involve during processing, identifying one or more additional components from which the one or more source components depend. In this case, at least one of the one or more additional components is configured for change notification. In addition, the method can involve storing in a registry one or more representations of the additional components configured for change notification. Furthermore, the method can involve indicating to the observing component directly that one or more of the one or more identified additional components have changed.

In addition, a method from the perspective of an observing component of observing data freshness in indirectly related components can involve an observing component calling one or more source components. In this case, calling the one or more source components further involves processing by one or more additional components from which the one or more source components depend. The method can also involve creating one or more dependency registries for the call to the one or more source components. In addition, the method can involve the dependency registry receiving the identity of all of the one or more source components and one or more additional components that are configured for change notifications. Furthermore, the method can involve identifying from the dependency registry that at least one additional component has changed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
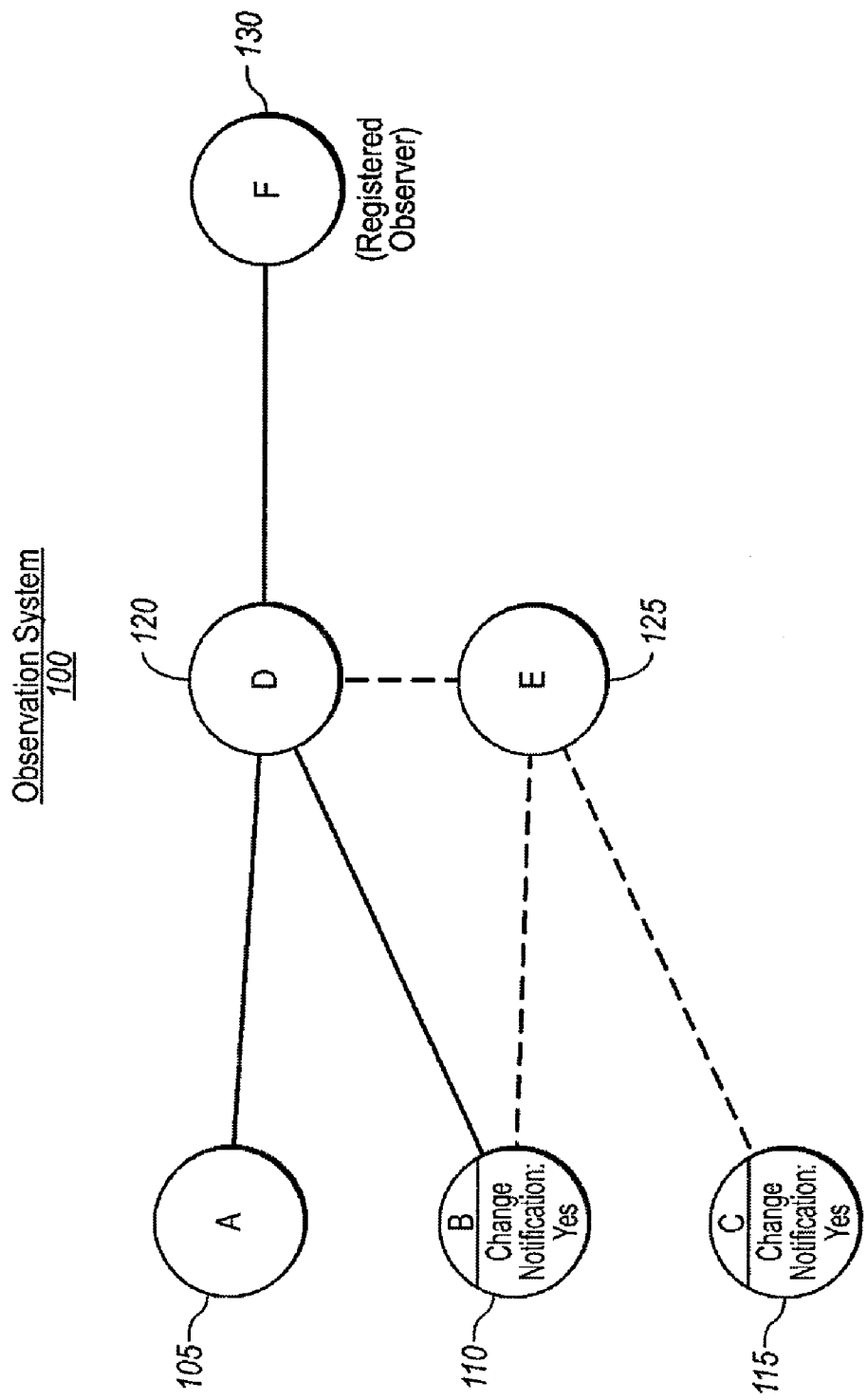
FIG. 1A illustrates an overview schematic diagram of a plurality of related software components including an observing component that depends on a plurality of other software components.

Implementations of the present invention extend to systems, methods, and computer program products configured to efficiently report data freshness to components that depend on a plurality of other components. In particular, implementations of the present invention include one or more mechanisms that allow an observation system identify one or more source components in a complex dependency chain, and to identify those components that are configured to change at some point. Implementations of the present invention further include one or more mechanisms that allow the observing component to directly identify that one of the underlying source components in the dependency chain has changed, without necessarily having to reprocess the entire dependency chain of components.

Accordingly, and as will be understood more fully herein, implementations of the present invention allow software components that are entirely agnostic of their existence to participate between change-notifying sources and observers/observing components. In one implementation, this can be done by building look-aside state (e.g., dependency registry) for the current thread(s) of execution, which picks up dependencies on source components as they are drawn upon by an ongoing computation. Observers (observing components) can then receive notification whenever at least one of the source components notifies of a change using any number of push or pull-style mechanisms. If desired, notified observers can then re-run the necessary computations throughout the dependency chain to detect whether or not those changes affect the observer's own state and, if so, take appropriate action to regain currency.

For example, and as discussed more fully herein, an observing component indicates that it wants to observe by publishing state somewhere indicating that dependencies should be gathered (e.g., into a "dependency registry"). The observing component then executes arbitrary code. During this execution, components that are aware of change notifications will also execute code. Code that is aware of (or configured for) change notifications can then register with the observation system, indicating that the given component is change-notification-aware, and may at a future time indicate that it has become out of date. This process can repeat until all code in the dependency chain completes processing.

In one implementation, the observing component can then indicate that it is done observing, and then identify whether any change notification dependencies were gathered by the system during execution. The observing component can also store a status indicator associated with this particular round of execution for future reference. The observing component can also register a listener callback with the observation system through the created dependency registry. The listener will, in turn, be called at a future time when any of the components that are gathered, and are configured for dependent change notifications, change.

To these and other ends described herein, therefore, implementations of the present invention include gathering dynamic dependencies encountered by actual code execution, and gathering dependencies with no modifications to intermediary code. In addition, implementations of the present invention include forming ambient dependency gathering scopes, and chaining of scopes to form directed graphs, including fine-grained suppression or isolation of scopes. In some cases, the dependencies can even be automatically dropped if they are invalidated before the gathering process completes. One will appreciate that implementations of the present invention can be configured to properly handle cycles and multi-threading, and can be easily integrated with traditional point-notification mechanisms.

FIG. 1A illustrates an overview schematic diagram of an observation system 100 comprising one or more software components that are directly or indirectly inter-dependent in one form or another. Specifically, FIG. 1A shows that component F 130 directly depends on software components D 120 and E 125 (also referred to simply as "F," "D" or "E"), and further that software component D 120 depends from components A 105, and B 110, and to some extent on component E 125 (also referred to simply as "A," "B," or "E"). In addition, FIG. 1A shows that component E depends on components B and C 115 (also referred to simply as "C"). Of course, each of components A, B, C, D, and E could depend still further on other additional components, and thus the more simple, example graph is illustrated for convenience.

In any case, there are a number of ways these components can depend on each other for various values or calculations, in both direct and indirect dependency contexts. For example, component F (130) might be configured to generate output display data that directly depends on one or more calculations by component D (120). This output display data generated by component F, in turn, might thus directly depend on certain other calculations or values provided by source component D and indirectly to some extent on component E. To calculate these values, component D might first retrieve values from one or all of components A, B, and C, and/or also consider a value provided by component E.

In this case, FIG. 1A shows that components D and E are only conditionally related to each other, as shown by dotted lines. For example, component D may be configured to calculate a value provided by component E only if that value is over some threshold amount. Similarly, component E, may also be conditionally dependent on both components B and C, such as by calculating a value based only on what is the greater or lesser value of the two, and only if some other threshold condition applies. Regardless of any such conditions or required threshold values, implementations of the present invention can ensure that component F can identify the presence of any changes in lower level, indirectly related components (e.g., A, B, and/or C).

As understood more fully herein, at least one way that this can be accomplished is at least in part is via one or more processes in which the observation system 100 directs the collection of dependencies based on one or more processing requests by a given component (e.g., component F). As understood more fully herein, this also involves the observation system 100 identifying components that are configured for "change notifications." In general, "change notifications" refers to a specific software component configuration in which the component publishes or otherwise reports its value changes, or even the mere fact of a value change. In conventional notification systems, a directly dependent component will identify the published change by registering a listener or other similar form of watching object with the source component. In the present example, therefore, components B and C will have identified themselves as proffering change notifications to component E, and component E will then listen to change notifications from components B and C.

Figure 1B:
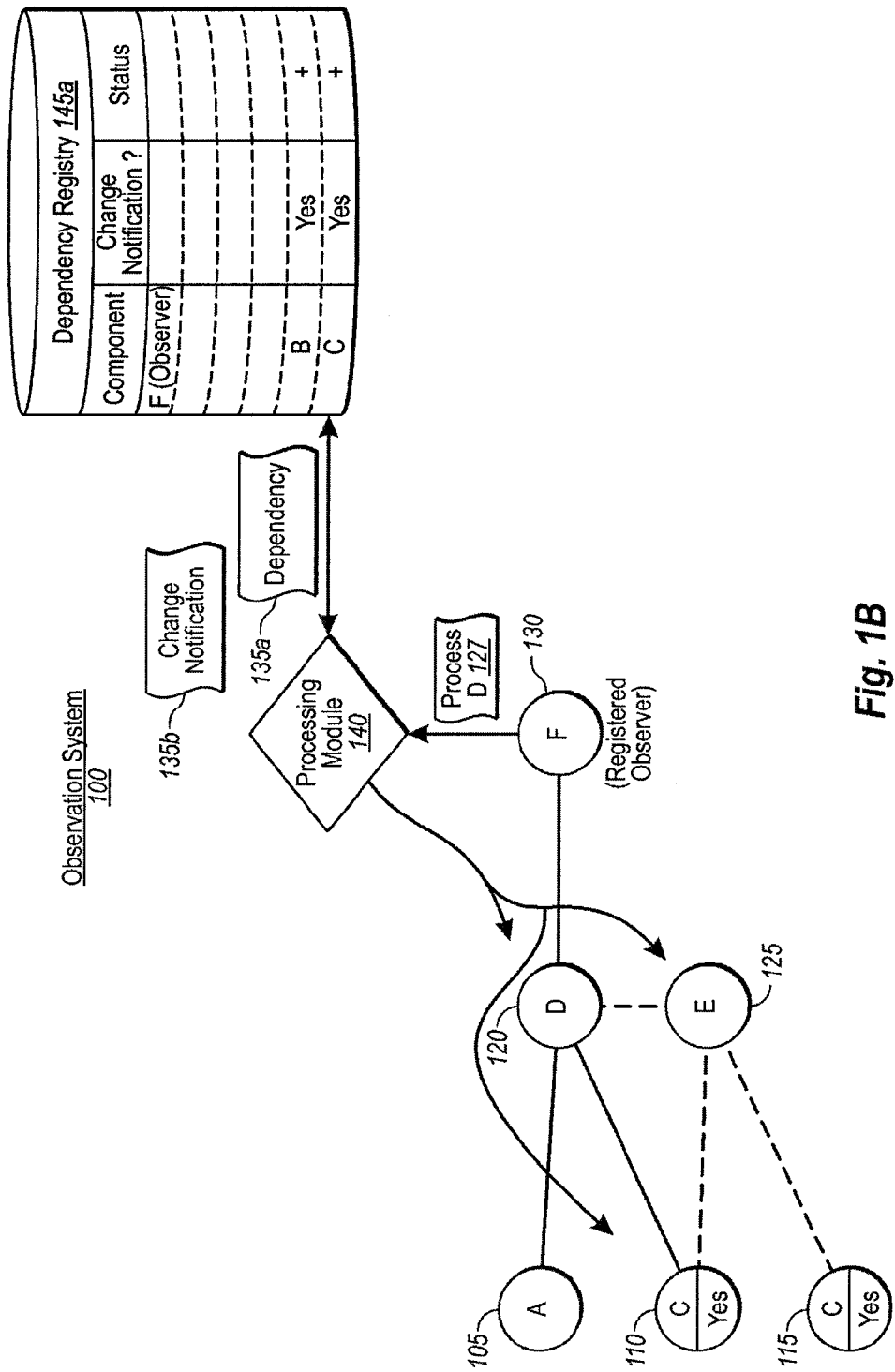
FIG. 1B illustrates the plurality of related software components shown in FIG. 1A in which the observing component of FIG. 1A collects dependencies in a dependency registry.

In the case of other components further along the dependency chain, however, FIG. 1B shows that an observing component can set up a separate registry to identify changes. For example, FIG. 1B shows that component F (130) establishes a dependency registry 145(a). Initially, this occurs when component F calls (e.g., 127) component D (120) a first time (or as component F directs). In such a case, processing module 140 follows the entire dependency chain for the specific processing request and identifies all dependencies. Of course, one will appreciate that the collection of dependencies can be tied to the "scope" of the processing request. That is, some processing requests by component F to component D (or other component) may implicate other components in some cases that are not implicated with other processing requests. Thus, the illustrated dependency chain represents one processing scope for component F.

In any event, FIG. 1B shows that processing module 140 places a representation of one or more of the dependencies in the dependency registry 145(a) set up by the observing component. Stated another way, dependency registry 145(a) collects dependencies for which a given component is configured for change notifications when each such identified component registers with the dependency registry 145. For example, FIG. 1B shows that processing module 140 sends messages 135a and 135b to dependency registry 145(a) indicating each directly and indirectly related component identified during processing request (127) that is configured for change notification.

For example, per component F'request 160 to call component D, each time processing module 140 encounters a particular software component in a dependency chain, processing module 140 asks if that particular component will or can change. If the given component (e.g., components A or B) is configured with static values (e.g., a non-changing string name), then the component might respond that no change is possible. In some cases, the given component may not even respond at all. In such a case, processing module 140 can then determine either that changes are unlikely, or unavailable, and update the registry 145 accordingly (e.g., messages 135a/b).

For example, FIG. 1B shows that processing module 140 sends one or more messages 135(a/b) to dependency registry 145(a) regarding components configured for change notifications. In at least one implementation, this sequence of messages (e.g., 135a/b) represents the fact that each component that is registered for change notification (e.g., component C), or is otherwise change-notification-aware, has registered (or is registering) with the dependency registry 145a. Thus, dependency registry 145a includes at least a representation for those components that are configured for change notification. Of course, one can appreciate that, in at least one implementation, dependency registry 145a can also be configured to include representations of components that are static, as well as components that are not change-notification-aware.

In the illustrated implementation, however, FIG. 1B shows that system 100 gathers and provides a representation for each change-notification-aware component in the dependency chain in dependency registry 145a, along with various status indicators for each such component. Specifically, FIG. 1B shows that dependency registry 145 designates a representation for components B, C with a "yes" (or the like) designation. As previously discussed, this means that the observation system 100 has identified from components B and/or C that it can or will change at some point, and that these components have registered with dependency registry 145a. In other cases, this "yes" designation simply means that the observation system 100 is otherwise uncertain about changes, and so uses a default "yes" designation to ensure nothing important is missed should one or both of the components ever change.

In addition, dependency registry 145 can include still additional information about each component in the dependency chain, such as information based on a particular state value for each component at execution. For example, at the time of the initial call by component F, each of components A-E may comprise some initial value used in the processing, such as a particular string or number value. As a result, FIG. 1B shows that each component in registry 145(a) is also associated with a status value of "+," which may change to a "−" upon any change in a given state value. In this particular case, the "+" sign for each component indicates the value used in processing the most recent request has not yet changed.

Along these lines, one will appreciate that there may be instances in which one or more of the identified dependencies has already changed during the collection process. In such cases, component F (130) and/or system 100, generally, can be configured to simply discard the dependency registry 145 and start over as desired. In such a case, therefore, one will appreciate that dependency registry 145(a) represents a completed collection of dependencies that have not yet changed.

Figure 1C:
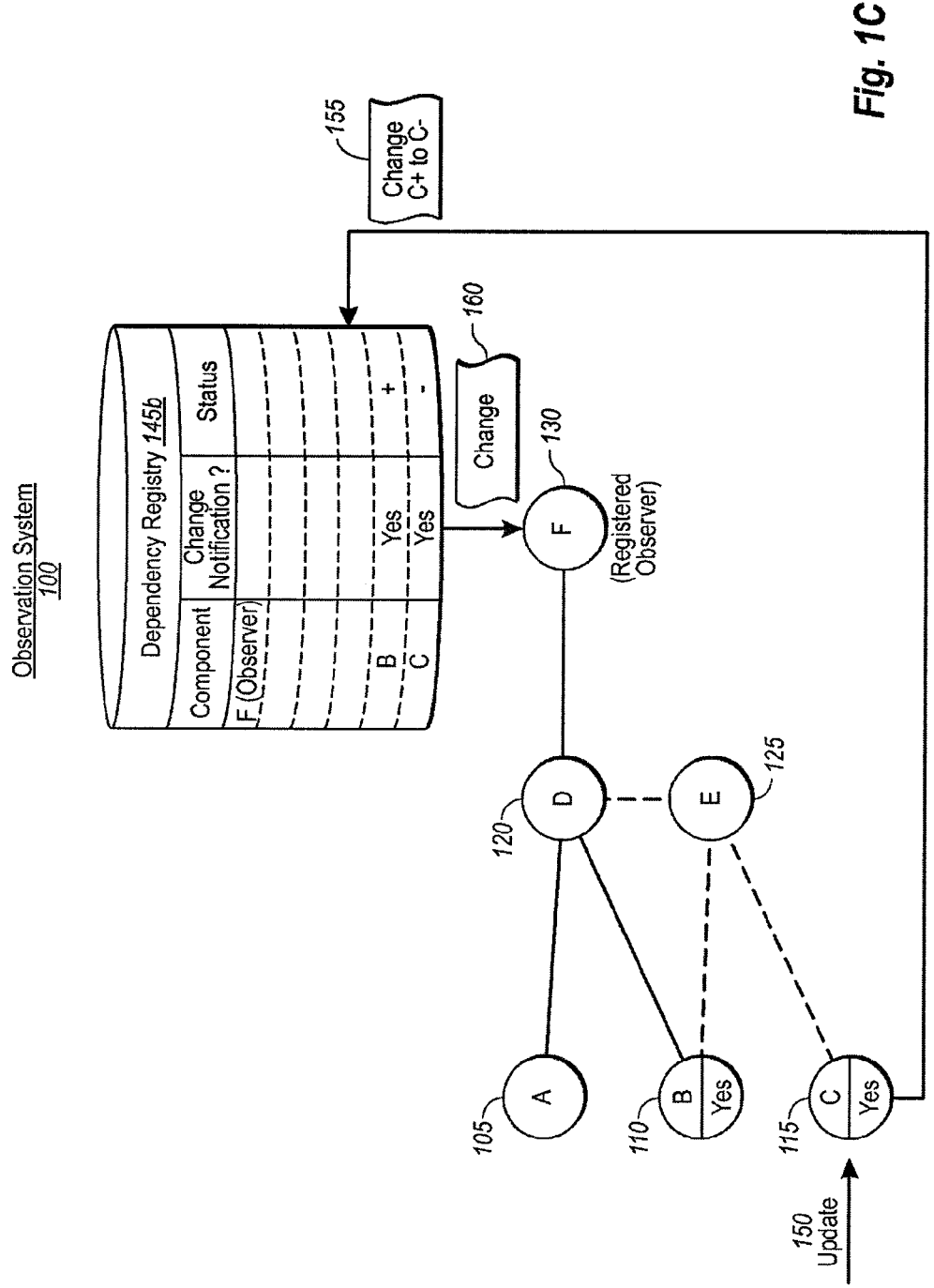
FIG. 1C illustrates an overview schematic diagram in which the observing component of FIGS. 1A through 1B identifies one or more changes in dependent components through the dependency registry.

In any event, there are any number of additional configurations and mechanisms that system 100 and/or component F (130) can implement to identify changes in the dependency chain. For example, FIG. 1C illustrates a schematic diagram in which component F (130) is notified of a change in an underlying source component C (115) through the dependency registry 145. Specifically, FIG. 1C shows that component C receives an update 150, such as a change in string value, change in numerical value, or change in some other parameter, whether processed by component C or received from yet another source component. Since dependency registry 145 comprises a representation or link to component C, FIG. 1C shows dependency registry 145 receives the published change, e.g., via message 155b. In this particular case, message 155b merely contains the fact of change in values. Thus, FIG. 1C shows in this particular case that message 155 simply requests or indicates a change in status from "+" to "−." Of course, in other implementations, message 155b could also or alternatively comprise the actual value of the change.

One will appreciate that since this change to one of the components' status means that particular component is out of date, this change also means that the overall dependency registry 145 is out of date. Accordingly, FIG. 1B shows that dependency registry 145 is now updated to 145(b). In either case, system 100 can report the fact of these changes in one or both of the changed component(s) or the staleness of dependency registry to the observing component (i.e., component F) any number of different ways.

For example, FIG. 1C shows that component F (130) identifies or receives this change in value or status via one or more messages 160. Message 160, in turn, can be sent or relayed in response to any number of different push or pull-style mechanisms. With respect to push-style mechanisms, for example, one implementation includes component F registering a listener with the dependency registry 145(b). With respect to pull-style mechanisms, one implementation includes component F continually querying various entities, such as dependency registry 145(b), or even individual components to identify changes. These mechanisms are discussed more fully below.

Regarding push-style changes, for example, component F could register a listener with dependency registry 145 upon completion of the entire collection process by processing module 140. In one implementation, this can mean that component F configures dependency registry 145 with change notifications when initially setting up dependency registry 145, and simply registers a listener with dependency registry 145. If component F registers a listener with dependency registry 145, component F will identify an overall change to the dependency chain anytime any status indicator for any of the component A-E changes in dependency registry 145.

Regarding pull-style mechanisms, component F may be configured to continually query dependency registry 145 to identify if the registry or components therein is/are out of date. Component F can be configured to perform this query as quickly as every few milliseconds or minutes, and even less frequently in terms of hours, days, or weeks, depending on the type of calculations and available resources that can or should be devoted to these requests. In either case, the results are effectively the same as described above with regard to the push-style mechanisms (e.g., resulting in message 160), and can be based on virtually any level of granularity. For example, the contents of message 160 can include a mere statement that registry 145b has changed (i.e., that some unnamed components in the dependency chain have changed), or that a specific one of the one or more components has changed. As shown, for example, message 160 indicates specifically in this case that component C has changed.

Component F 130 can then identify how exactly to process the received information. For example, component F could present one or more values to a user via a display output (or via a message to some other component) that indicates that a particular value in the dependency chain is now out of date. If component C was the value of a checking account that has now been updated, component F might then automatically display a flag next to the account name/number. However provided, another entity (e.g., a user, or automated entity) can then make a determination about how to proceed. For example, a user might then refresh their account browser to refresh and obtain the updated value, which, in turn, would cause component F to reprocess all calculations in the dependency chain, as before. Similarly, component F 130 could make its own determinations to reprocess all components in the dependency chain.

Accordingly, FIG. 1A-1C and the corresponding text provide a number of components and mechanisms for providing data freshness indications to components that may be only indirectly related, without necessarily requiring an entire reprocessing of all components in a dependency chain. One will appreciate that this relatively passive approach to reporting status changes can provide a great deal of efficiency and confidence in the accuracy of underlying data, particularly in the case of complex software dependencies.

Figure 2:
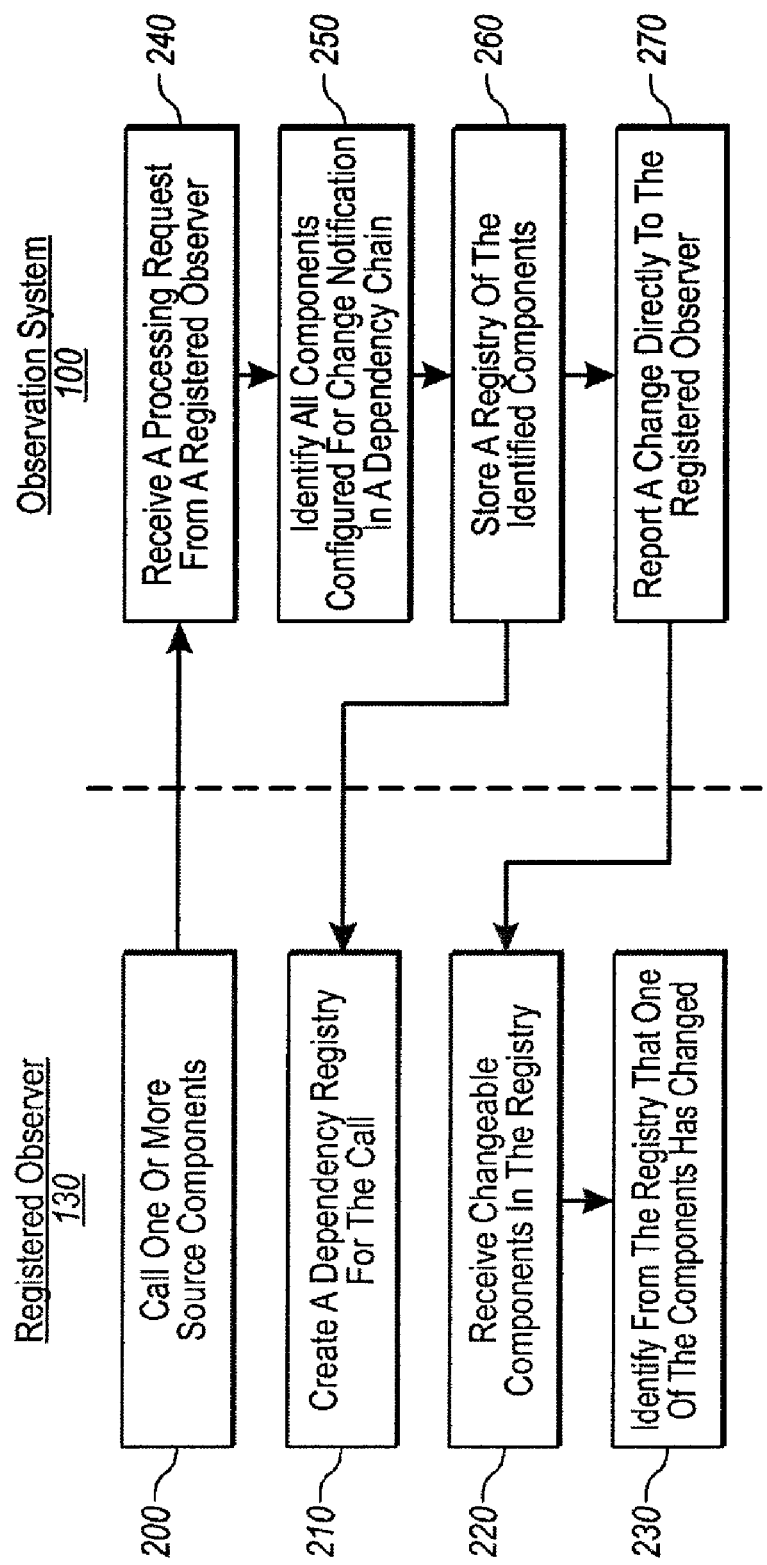
FIG. 2 illustrates of a series of flow charts of methods comprising one or more acts in methods from the perspective of a registered observer and the observation system generally for efficiently reporting/receiving changes in indirectly dependent components.

In addition to the foregoing, implementations of the present invention can also be described in terms of methods comprising one or more acts for accomplishing a particular result. For example, FIG. 2 illustrates methods from the perspective of a registered observer 130 and of an observation system 100 for gathering and reporting status information directly to one or more observing components without requiring an entire recalculation of dependency chain components. The acts of FIG. 2 are described more fully below with respect to the components and diagrams in FIGS. 1A through 1C.

For example, FIG. 2 shows that a method from the perspective of a registered observer can comprise an act 200 of calling one or more source components. Act 200 includes calling one or more source components, wherein calling the one or more source components further involves processing one or more additional components from which the one or more source components depend. For example, as shown in FIG. 1B, component F (130) requests (via message 127) processing of a source component D (120) via processing module 140.

Component D, in turn, calls or otherwise processes one or more additional components A (105), B (110) and/or C (115), from which component D depends.

FIG. 2 also shows that the method from the perspective of registered observer 130 can comprise an act 210 of creating a dependency registry for the call. Act 210 creating one or more dependency registries for the one or more calls to the one or more source components. For example, as shown in FIG. 1B, component F generates dependency registry 145(a/b) in conjunction with the request to process source component D.

In addition, FIG. 2 shows that the method from the perspective of registered observer 130 can comprise an act 220 of receiving changeable components in the registry. Act 220 includes the dependency registry receiving a representation of all of the one or more source components and one or more additional components that are configured for change notification. As shown in FIG. 1B for example, dependency registry 145 comprises a representation of each components B-C therein, as well as status that indicates, for example, that the data in the corresponding components have not yet changed. For example, components B (110) and C (115), can register with dependency registry 145(a) (e.g., via messages 153a-b) to indicate they are configured for change notification. Dependency registry 145(a) thus receives these registrations, and stores a representation to each such component (B and C).

Furthermore, FIG. 2 shows that a method from the perspective of registered observer 130 can comprise an act 230 of identifying from the registry that one of the components has changed. Act 230 includes identifying from the dependency registry that at last one additional component has changed. As shown in FIG. 1C for example, as soon as an update 150 is processed in component C 115, component F 130 receives one or more messages (e.g., 160) directly from dependency registry 145 (rather than by calling component D again), which indicate a change to component C 115, or which indicate a change into the overall chain of software components.

In addition, FIG. 2 shows that a method from the perspective of observation system 100 of reporting changes in underlying components directly to one or more observing components, can comprise an act 240 of receiving a processing request from a registered observer. Act 240 includes receiving one or more requests from an observing component to process data corresponding to one or more source components. For example, observation system 100 receives one or more requests (via processing module 140) from component F (130) to process component D (120). Observation system 100 then, in conjunction with processing this request, identifies all of the components forming the corresponding dependency chain.

FIG. 2 also shows that the method from the perspective of observation system 100 can comprise an act 250 of identifying all components configured for change notifications in a dependency chain. Act 250 includes, during processing, identifying one or more additional components from which the one or more source components depend, wherein at least one of the one or more additional components is configured for change notification. For example, in addition to identifying component F'request to process source component D, processing module 140 also identifies underlying additional components A, B, and C, from which component D depends. Furthermore, processing module 140 identifies that only components B (110) and C (115) are registered for change notifications.

In addition, FIG. 2 shows the method from the perspective of observation system 100 can comprise an act 260 of storing a registry of the identified components. Act 260 includes storing in a registry one or more representations of the additional components configured for change notification. For example, FIGS. 1B and 1C show that dependency registry 145(a/b) includes a representation of those components on which component F directly or indirectly, which are also configured for change notifications. Specifically, FIGS. 1B and 1C show that indirectly related components B and C are represented in the dependency registry 145(a).

Furthermore, FIG. 2 shows that the method from the perspective of observation system 100 can comprise an act 270 of reporting a change directly to the registered observer. Act 270 includes indicating to the observing component directly that one or more of the one or more identified additional components have changed. For example, as shown in FIG. 1C, as soon as component C has processed update 150, system 100 provides (e.g., via registry 145 and messages 155/160) component F with an indication of that change. As previously discussed, the message(s) sent to component F can include a specific indication with regard to the status of component C, or a generalized indication of the status of the overall dependency chain. Furthermore, as also previously discussed, component F can receive this information via any number of push or pull-style mechanisms.

Accordingly, FIG. 1A-2 provide a number of components and methods for ensuring that observing component can efficiently receive indications regarding the currency of underlying data in complex dependency chains. One will appreciate that such components and mechanisms can be applied quite broadly to a number of different software architectures and applications. These components and mechanisms can be particularly useful where the relative newness of recently calculated data is important, and the calculated data involve a large number of underlying components.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At an observation system in a computerized environment comprising a plurality of interrelated software components including one or more observing components that depend from one or more source components, which further depend from one or more additional components, a method of reporting data freshness in the one or more additional components directly to the one or more observing components, comprising the acts of:
   processing data corresponding to one or more source components that provide one or more data values to an observing component;
   during processing, identifying one or more additional components that each provide one or more data values to at least one of the one or more source components, wherein at least one of the additional components is configured to provide a change notification when a data value that is available to the one or more source components has changed;
   storing in a registry: (i) at least one representation of each additional component that is configured to provide a change notification, each representation indicating whether a corresponding additional component is configured to provide a change notification; and (ii) one or more status indicators corresponding to each additional component that is configured to provide a change notification, each status indicator indicating when the data value of the corresponding additional component has changed;
   identifying a change to a particular data value available from a particular additional component;
   changing the one or more status indicators corresponding to the particular additional component in the registry to indicate that the particular data value has changed; and
   indicating to the observing component that one or more data values available from the one or more identified additional components have changed.

2. The method as recited in claim 1, further comprising receiving one or more requests from the observing component to process data corresponding to the one or more source components.

3. The method recited in claim 2, wherein the observing component is only indirectly dependent on the one or more additional components via at least one of the one or more source components.

4. The method as recited in claim 1, further comprising:
   registering a listener for the observing component with the registry.

5. The method recited in claim 1, wherein the registry is a dependency registry.

6. The method as recited in claim 1, wherein indicating to the observing component that the one or more data values available from the one or more identified additional components have changed is made to the observing component directly, and includes receiving a request from the observing component to determine whether the registry is up to date.

7. The method as recited in claim 1, further comprising:
   identifying each additional component that is configured to provide a change notification.

8. The method as recited in claim 7, wherein identifying each additional component includes querying each source component or additional component to determine whether the component will never change.

9. The method as recited in claim 7, wherein identifying each additional component notifications further comprises:
   receiving no response to the query for change; or
   receiving a response that the one or more additional components can change.

10. The method as recited in claim 7, further comprising:
    identifying at least one component that is not configured to provide a change notification.

11. The method as recited in claim 10, wherein identifying the at least one component that is not configured to provide a change notification further comprises receiving a response from the queried component that the component will never change.

12. The method as recited in claim 1, wherein indicating to the observing component that the one or more data values available from the one or more identified additional components have changed includes reporting to the observing component that the registry is out of date.

13. One or more computer-readable storage devices having stored therein computer executable instructions that, when executed by one or more processors of a computing system cause the computing system to perform a method of reporting data freshness in one or more additional components directly to one or more observing components, the method including:
    processing data corresponding to one or more source components that provide one or more data values to an observing component;
    during processing, identifying one or more additional components that each provide one or more data values to at least one of the one or more source components, wherein at least additional components is configured to provide a change notification when a data value that is available to the one or more source components has changed;
    storing in a registry: (i) at least one representation of each additional components that is configured to provide a change notification, each representation indicating whether a corresponding additional component is configured to provide a change notification; and (ii) one or more status indicators corresponding to each additional component that is configured to provide a change notification, each status indicator indicating when the data value of the corresponding additional component has changed;
    identifying a change to a particular data value available from a particular additional component;
    changing the one or more status indicators corresponding to the particular additional component in the registry to indicate that the particular data value has changed; and
    indicating to the observing component that one or more data values available from the one or more identified additional components have changed.

14. The one or more computer-readable storage devices as recited in claim 13, wherein the method includes registering a listener with the registry to identify when any of the additional components that are registered to provide change notifications have changed.

15. The one or more computer-readable storage devices as recited in claim 13, the method including querying the registry to determine whether the registry has changed.

16. The one or more computer-readable storage devices as recited in claim 13, the method further including, after identifying that the at least one additional component has changed, calling the one or more source components again.

17. The one or more computer-readable storage devices as recited in claim 16, the method including the observing component providing output that indicates that the particular data value associated with the at least one additional component is now out of date.

18. The one or more computer-readable storage devices as recited in claim 17, wherein calling the one or more source components again is based on a response to the provided output that the additional component is out of date.

19. A data storage device usable within an observation system of a computerized environment that includes a plurality of software components, including an observing component that depends, directly or indirectly, from one or more additional components, the data storage device storing:

at least one dependency registry including information about the one or more additional components, and including, for each of the plurality of additional components:

a component identification section providing a unique identification of a respective one of the plurality of additional components;

a change notification section which identifies when the respective one of the plurality of additional components is configured to provide a change notification, the change notification being provided when a respective data value of the respective one of the plurality of additional components that is available to another component has changed; and a status section including an indication of only one of: (i) when the respective data value of the respective one of the plurality of additional components has changed; or, alternatively, (ii) when the respective data value of the respective one of the plurality of additional components has not changed, wherein the dependency registry is used by an observing component to identify when a change in data value has occurred in any of the plurality of additional components.

\* \* \* \* \*

UNITED STATES PATENT AND TRADEMARK OFFICE
CERTIFICATE OF CORRECTION

PATENT NO. : 8,214,340 B2  Page 1 of 1
APPLICATION NO. : 13/016859
DATED : July 3, 2012
INVENTOR(S) : Szyperski et al.

It is certified that error appears in the above-identified patent and that said Letters Patent is hereby corrected as shown below:

In the Claims:

In column 12, line 6, in Claim 9, delete "notifications" and insert -- notification --, therefor.

In column 12, line 35, in Claim 13, after "least" insert -- one of the --.

In column 12, line 39, in Claim 13, delete "components" and insert -- component --, therefor.

Signed and Sealed this
Ninth Day of October, 2012

David J. Kappos
*Director of the United States Patent and Trademark Office*